3,850,998
SEPARATION OF MONOCHLORO-O-XYLENES
Heinz Eilingsfeld, Frankenthal, and Manfred Patsch, Ludwigshafen, Germany, assignors to Badische Anilin & Soda-Fabrik Aktiengesellschaft, Ludwigshafen (Rhine), Germany
No Drawing. Filed Jan. 12, 1973, Ser. No. 323,136
Int. Cl. C07c 25/04
U.S. Cl. 260—650 R 9 Claims

ABSTRACT OF THE DISCLOSURE

The invention relates to a process for the separation of monochloro-o-xylene mixtures into 3-chloro-o-xylene and 4-chloro-o-xylene, the monochloro-o-xylene mixture being reacted in the presence of a Friedel-Crafts catalyst with selected alkylating agents to give a mixture of 3-chloro - 5 - alkyl-o-xylene and 4-chloro-5-alkyl-o-xylene, this mixture then being separated and the alkyl group eliminated from the 3-chloro-5-alkyl-o-xylene.

---

The present invention relates to a process for separating mixtures of monochloro-o-xylenes into 3-chloro-o-xylene and 4-chloro-o-xylene.

Conventional industrial nuclear chlorination of o-xylene into monochloro-o-xylene, which takes place extremely readily, results essentially in a mixture of 3-chloro-o-xylene and 4-chloro-o-xylene in a ratio of about 1:1. Since the boiling points of the two isomers at 191.0° and 192.4° C. lie very close to one another, satisfactory separation is not possible by distillation. Sharp separation of the mixture of isomers is necessary however if the individual components are to serve as starting products for specific syntheses. There is therefore the need for a separation method to be found which makes it possible to obtain particularly 3-chloro-o-xylene in the pure state from the chlorination mixtures obtained in the nuclear chlorination of o-xylene.

We have now found that chlorination mixtures of o-xylene consisting essentially of 3-chloro-o-xylene and 4-chloro-o-xylene can be separated into 3-chloro-o-xylene and 4-chloro-o-xylene by alkylating the chlorination mixture in the presence of a Friedel-Crafts catalyst with a compound which under the reaction conditions forms a tert.-butyl radical or 1,1,3,3,-tetramethylbutyl-(1) radical, separating the nonalkylated portion containing substantially 4-chloro-o-xylene from the 3-chloro-5-alkyl-o-xylene and then eliminating the alkyl group from the 3-chloro-5-alkyl-o-xylene. The 3-chloro-o-xylene is then isolated by distillation in the conventional way. Elimination of the alkyl group may be dispensed with if only the further use of the 4-chloro-o-xylene is of interest.

The following are suitable compounds which under the conditions of the Friedel-Crafts reaction form a tert.-butyl or a 1,1,3,3-tetramethylbutyl-(1) radical: tert.-butyl chloride, tert.-butyl bromide, tert.-butanol, isobutene, diisobutene, 1,1,3,3 - tetramethylbutanol - (1), and 1,1,3,3-tetramethylbutyl-(1) chloride and bromide. Isobutene and diisobutene are preferred for process technological and economical reasons.

The amount of the compounds which form the said radicals under the reaction conditions of the Friedel-Crafts reaction (hereinafter also referred to as alkylating agents) is conveniently 1 mole to 2 moles per mole of 3-chloro-o-xylene.

Alkylation is carried out in the presence of a Friedel-Crafts catalyst such as aluminum chloride, ferric chloride, zinc chloride, stannic chloride, antimony pentachloride, boron trifluoride, sulfuric acid, hydrogen chloride, and hydrogen fluoride. The amount of catalyst for the alkylation reaction is generally from 0.01 to 1 mole per mole of 3-chloro-o-xylene to be alkylated.

The temperature at which the alkylation is carried out is dependent mainly on the activity of the catalyst used and the alkylating agent. It is generally in the range from −20° to 100° C. When unsaturated hydrocarbons are used as alkylating agents the reaction proceeds optimally within the range from −20° to +30° C., preferably from 0° to +15° C. When the alkylating agents used contain a hydroxyl group or a halogen as a functional group, the alkylation is advantageously effected at from 20° to 100° C., preferably from 50° to 80° C.

The reaction may be carried out in the absence or presence of an inert solvent or diluent. The solvent or diluent may be one of those usually employed for alkylation reactions and which are liquid at the reaction temperature, in the usual amounts, for example carbon disulfide, carbon tetrachloride, nitrobenzene, chlorobenzene, dichlorobenzene and particularly cyclohexane. The reaction is generally over after one hour to ten hours. It is promoted by good mixing. This may be effected for example by stirring or by boiling under reflux, good maintenance of the temperature being achieved in this way at the same time. The end of the reaction may be recognized for example by means of spectroscopic analysis of a sample.

In a convenient method of carrying out the invention the procedure is that the chlorination mixture of o-xylene or a solution thereof in an inert solvent is placed in a vessel, the alkylation catalyst is introduced into this mixture and the alkylating agent is then gradually added, for example by dripping or passing it in.

The reaction proceeds with a good yield, i.e. up to 70% or more, selectively to 3-chloro-5-alkyl-o-xylene while the 4-chloro-o-xylene does not react. After the alkylation is over, the 4-chloro-o-xylene and the 3-chloro-5-alkyl-o-xylene are separated from the reaction mixture, for example by distillation, preferably at subatmospheric pressure, or by fractional crystallization. The 4-chloro-o-xylene fraction generally contains up to 20% by weight of 3-chloro-o-xylene.

The 3-chloro-5-alkyl-o-xylene fraction is then converted in the presence of a dealkylation catalyst (for which purpose for example the Friedel-Crafts set out above for the alkylation are suitable) with elimination of the alkyl radical present in the 5-position into pure 3-chloro-o-xylene. This dealkylation reaction may be carried out in solution, in a melt or in the gas phase. When it is carried out in solution it is advisable to use as the solvent a substance which will serve as acceptor for the alkyl radical to be eliminated, such as benzene, toluene, xylene, naphthalene, phenol, and phenol ethers such as anisol and phenetol; carbon monoxide is also a suitable acceptor for the alkyl radical under conditions such as are described in J. Org. Chem. 28 (1963), pages 1218 et seq. For elimination in a melt an aluminum chloride melt has proved to be particularly suitable; sodium chloride and/or potassium chloride or urea may be mixed with the aluminum chloride. In the case of elimination in the gas phase it is convenient to use a solid catalyst, for example an aluminum oxide/boron oxide catalyst or an aluminum oxide/polyphosphoric acid catalyst over which the 3-chloro-5-alkyl-o-xylene is passed in the gas phase; an inert carrier gas, for example nitrogen may be used and subatmospheric pressure may be employed. Depending on the dealkylation method used a temperature range is chosen for the elimination reaction within which migration of substituents at the aromatic nucleus and consequently isomerization does not occur. A temperature range of from 30° to 400° C. is usually used, a range of from 30° to 100° C. being preferred for carrying out the reaction in solution, from 80° to 150° C. for carrying it out in a melt and from 200° to 300° C. for carrying it out in the gas phase. These ranges are not limiting however; the most suitable temperatures should be determined in each case.

The 3-chloro-o-xylene formed in the dealkylation reaction may easily be isolated in pure form by conventional methods of separation, for example by distillation, preferably at subatmospheric pressure. The 3-chloro-o-xylene and 4-chloro-o-xylene obtained may then be further processed, for example used for synthesizing the corresponding chlorophthalonitriles, phthalocyanine pigments and anthraquinone dyes.

The process according to the invention is further illustrated in the following Examples. The parts and percentages given are by weight.

EXAMPLE 1

98 parts of monochloro-o-xylene (3-chloro-o-xylene and 4-chloro-o-xylene in the ratio 1:1) is dissolved in 27 parts of concentrated sulfuric acid. 40 parts of isobutene is introduced in gaseous form in the course of two hours at 4° to 10° C. Two layers form. The upper layer is separated and fractionally distilled. 50 parts of monochloro-o-xylene distils over at 85° to 90° C. at 21 mm. Hg; it consists of 85% of 4-chloro-o-xylene and 15% of 3-chloro-o-xylene. 37 parts of 3-chloro-5-tert.-butyl-o-xylene is isolated at 139° to 140° C. at 29 mm. Hg. 39.4 parts of 3-chloro-5-tert.-butyl-o-xylene obtained in the manner described is dissolved in 50 parts of benzene. 3 parts of aluminum chloride is added to the solution and hydrogen chloride gas is passed in slowly for three hours at 80° C. The solution is then poured onto ice-water and the organic phase is separated and distilled. 22.5 parts (80% of the calculated yield) of 3-chloro-o-xylene is obtained at 78° to 83° C. and 18 mm. Hg.

EXAMPLE 2

185 parts of tert.-butyl chloride is dripped at 70° to 80° C. within ten hours into a mixture of 140.3 parts of monochloro-o-xylene as described in Example 1 and 68 parts of zinc chloride. The solid constituents are separated by suction filtration and the residue is washed with o-xylene and fractionally distilled. 65 parts of monochloro-o-xylene is isolated and at 122° to 124° C. at 15 mm. Hg 65 parts of 3-chloro-5-tert.-butyl-o-xylene is isolated. 48.6 parts thereof is introduced into a melt of 100 parts of aluminum chloride, 10 parts of sodium chloride and 5 parts of potassium chloride at 110° to 120° C. After two hours the melt is poured onto 500 parts of ice in 50 parts of concentrated hydrochloric acid, the organic phase is separated and the aqueous phase is extracted twice with 100 parts of benzene. Fractionation is carried out and 25 parts (72% of the calculated yield) of pure 3-chloro-o-xylene is obtained at 78° to 83° at 18 mm. Hg.

EXAMPLE 3

75 parts of tert.-butanol is dripped at 60° to 70° C. into a mixture of 140.5 parts of monochloro-o-xylene as described in Example 1 and 20 parts of concentrated sulfuric acid. The reaction mixture is kept at this temperature for three hours and then poured onto 300 parts of ice-water. The organic phase is separated, the aqueous phase is extracted twice with 100 parts of benzene and fractional distillation is carried out. 70 parts of monochloro-o-xylene and 49 parts of 3-chloro-5-tert.-butyl-o-xylene are isolated.

A vertical glass tube having a length of 1 meter is filled with 800 parts of a catalyst of $Al_2O_3/B_2O_3$ (ratio 1:1). The catalyst is heated to 250° C. by external heating. A vessel containing 39.3 parts of 3-chloro-5-tert.-butyl-o-xylene at 100° C. is connected to the top of the tube. A cooled receiver is attached at the bottom. The 3-chloro-5-tert.-butyl-o-xylene is blown through the catalyst zone in the course of five hours by means of a stream of nitrogen of about 40 liters per hour. 24 parts (85% of the calculated yield) of pure 3-chloro-o-xylene collects in the receiver.

EXAMPLE 4

98 parts of monochloro-o-xylene as described in Example 1 is dissolved in 13.5 parts of concentrated sulfuric acid. At 5° to 10° C. 84 parts of diisobutylene is dripped in while stirring. After two hours the upper layer is separated, washed with water and fractionally distilled. Within the boiling range of 85° to 90° C. at 16 mm. Hg there is obtained 56 parts of chloro-o-xylene consisting of 80% of 4-chloro-o-xylene and 20% of 3-chloro-o-xylene and within the boiling range of 147° to 158° C. at 16 mm. Hg 46 parts of 3-chloro-5-(1′,1′,3′,3′-tetramethylbutyl)-o-xylene.

50.4 parts of 3-chloro-5-(1′,1′,3′,3′-tetramethylbutyl)-o-xylene is introduced into a melt of 100 parts of aluminum chloride, 10 parts of sodium chloride and 5 parts of potassium chloride. After reaction for three hours at 100° to 110° C., the melt is poured into a mixture of 500 parts of ice-water and 50 parts of concentrated hydrochloric acid. Extraction with benzene is carried out and the benzene phase is fractionally distilled. 19 parts (68% of the calculated yield) of 3-chloro-o-xylene is obtained.

EXAMPLE 5

37 parts of 3-chloro-5-tert.-butyl-o-xylene, prepared according to Example 1, is dripped in the course of thirty minutes into a melt of 100 parts of aluminum chloride and 15 parts of urea at 80° to 100° C. The melt is left for two hours at this temperature and then poured onto a mixture of 500 parts of ice-water and 50 parts of concentrated hydrochloric acid. The mixture is extracted twice with 200 parts of benzene and the benzene solution is fractionally distilled. 20 parts of pure 3-chloro-o-xylene is obtained at 78° to 83° C. at 18 mm. Hg.

We claim:

1. A process for the separation of an o-xylene mixture consisting essentially of 3-chloro-o-xylene and 4-chloro-o-xylene, said process comprising:
    alkylating the o-xylene mixture at a temperature of from −20° C. to 100° C. with one to two moles per mole of 3-chloro-o-xylene of a compound selected from the group consisting of tert.-butyl chloride, tert.-butyl bromide, tert.-butanol, isobutene, diisobutylene, 1,1,3,3-tetramethyl butanol-(1), 1,1,3,3-tetramethyl butyl-(1) chloride and 1,1,3,3-tetramethylbutyl-(1) bromide in the presence of a Friedel-Crafts catalyst employed in an amount of from 0.01 to 1 mole per mole of 3-chloro-o-xylene;
    separating a non-alkylated 4-chloro-o-xylene-fraction from the resulting 3-chloro-5-alkyl-o-xylene; and
    then dealkylating the alkyl radical from the isolated 3-chloro-5-alkyl-o-xylene.

2. A process as claimed in Claim 1 wherein the o-xylene mixture is alkylated with isobutene.

3. A process as claimed in Claim 1 wherein the o-xylene mixture is alkylated with diisobutene.

4. A process as claimed in Claim 1 wherein the alkyl radical situated in the 5-position of the isolated 3-chloro-5-alkyl-o-xylene is dealkylated in the presence of a Friedel-Crafts catalyst.

5. A process as claimed in Claim 1 wherein the alkyl radical situated in the 5-position of the isolated 3-chloro- 5-alkyl-o-xylene is dealkylated in the presence of a Friedel-Crafts catalyst and a compound selected from the group consisting of benzene, toluene, xylene, naphthalene, phenol, anisol and phenetol.

6. A process as claimed in Claim 1 wherein the alkyl radical situated in the 5-position of the isolated 3-chloro-5-alkyl-o-xylene is dealkylated in a melt of a Friedel-Crafts catalyst.

7. A process as claimed in Claim 1 wherein the alkyl radical situated in the 5-position of the 3-chloro-5-alkyl-o-xylene is dealkylated in the gas phase in contact with a dealkylation catalyst.

8. A process as claimed in Claim 1 wherein the o-xylene mixture is alkylated with a compound selected from the group consisting of isobutene and diisobutene at a temperature of −20° C. to 30° C.

9. A process as claimed in Claim 1 wherein the o-xylene mixture is alkylated with a compound selected from the group consisting of tert.-butyl chloride and bromide, tert.-butanol, 1,1,3,3-tetramethylbutyl-(1)-chloride and bromide, and 1,1,3,3-tetramethylbutanol-(1) at a temperature of 20° C. to 100° C.

References Cited

UNITED STATES PATENTS

| | | | |
|---|---|---|---|
| 2,603,662 | 7/1952 | Stevens | 260—650 |
| 2,435,087 | 1/1948 | Luten et al. | 260—624 E X |

FOREIGN PATENTS

| | | | |
|---|---|---|---|
| 645,446 | 11/1950 | Great Britain | 260—624 A |
| 557,519 | 11/1943 | Great Britain | 260—624 A |
| 1,110,029 | 4/1968 | Great Britain | 260—650 R |
| 1,110,030 | 4/1968 | Great Britain | 260—650 R |

OTHER REFERENCES

Dokukina et al., Chem. Abs. *54*, 10906a, 1960.

Beilstein, Handbuch der Organischen Chemie, Julius Springer, Berlin (1922), *5*, p. 363.

Knight et al., J. Org. Chem, *28*, p. 1218–19, 1963.

HOWARD T. MARS, Primary Examiner

UNITED STATES PATENT AND TRADEMARK OFFICE
CERTIFICATE OF CORRECTION

PATENT NO. : 3,850,998
DATED : November 26, 1974
INVENTOR(S) : Heinz Eilingsfeld et al.

It is certified that error appears in the above—identified patent and that said Letters Patent are hereby corrected as shown below:

In Column 1, insert after line 7, "Claims priority, application Germany, January 19, 1972, P 22 02 370.7"

Signed and Sealed this

Twentieth Day of July 1976

[SEAL]

Attest:

RUTH C. MASON
*Attesting Officer*

C. MARSHALL DANN
*Commissioner of Patents and Trademarks*